United States Patent
Gleiner et al.

(10) Patent No.: US 8,733,111 B2
(45) Date of Patent: May 27, 2014

(54) COOLING HOLE WITH ASYMMETRIC DIFFUSER

(75) Inventors: Matthew S. Gleiner, Vernon, CT (US); Atul Kohli, Tolland, CT (US); Mark F. Zelesky, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/544,136

(22) Filed: Jul. 9, 2012

(65) Prior Publication Data

US 2013/0205792 A1    Aug. 15, 2013

Related U.S. Application Data

(60) Provisional application No. 61/599,387, filed on Feb. 15, 2012, provisional application No. 61/599,381, filed on Feb. 15, 2012, provisional application No. 61/599,372, filed on Feb. 15, 2012.

(51) Int. Cl.
*F02C 7/12* (2006.01)

(52) U.S. Cl.
USPC ............................... 60/806; 415/115; 415/116

(58) Field of Classification Search
USPC ............ 60/752–760, 804, 806; 415/115, 116; 416/96 R, 97 R
See application file for complete search history.

(56) References Cited

U.S. PATENT DOCUMENTS

| | | |
|---|---|---|
| 4,197,443 A | 4/1980 | Sidenstick |
| 4,529,358 A | 7/1985 | Papell |
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |

(Continued)

FOREIGN PATENT DOCUMENTS

| | | |
|---|---|---|
| EP | 1326007 A2 | 7/2003 |
| EP | 1609949 A1 | 12/2005 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Phutthiwat Wongwian
(74) *Attorney, Agent, or Firm* — Kinney & Lange, P.A.

(57) ABSTRACT

A gas turbine engine component includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally from the metering section and a second lobe adjacent the first lobe and diverging longitudinally and laterally from the metering section.

20 Claims, 9 Drawing Sheets

(56) References Cited

U.S. PATENT DOCUMENTS

| | | | |
|---|---|---|---|
| 5,382,133 A | 1/1995 | Moore et al. | |
| 5,418,345 A | 5/1995 | Adamski | |
| 5,419,681 A | 5/1995 | Lee | |
| 5,609,779 A | 3/1997 | Crow et al. | |
| 5,651,662 A | 7/1997 | Lee et al. | |
| 5,660,525 A | 8/1997 | Lee et al. | |
| 5,683,600 A | 11/1997 | Kelley et al. | |
| 5,813,836 A | 9/1998 | Starkweather | |
| 6,139,258 A | 10/2000 | Lang, III et al. | |
| 6,183,199 B1 | 2/2001 | Beeck et al. | |
| 6,241,468 B1 | 6/2001 | Lock et al. | |
| 6,243,948 B1 | 6/2001 | Lee et al. | |
| 6,287,075 B1 | 9/2001 | Kercher | |
| 6,307,175 B1 | 10/2001 | Blochlinger et al. | |
| 6,494,678 B1 | 12/2002 | Bunker | |
| 6,547,524 B2 | 4/2003 | Kohli et al. | |
| 6,572,335 B2 | 6/2003 | Kuwabara et al. | |
| 6,744,010 B1 | 6/2004 | Pepe et al. | |
| 6,944,580 B1 | 9/2005 | Blume et al. | |
| 6,973,419 B1 | 12/2005 | Fortin et al. | |
| 6,979,176 B2 | 12/2005 | Nakamata et al. | |
| 7,186,085 B2 | 3/2007 | Lee | |
| 7,273,351 B2 | 9/2007 | Kopmels | |
| 7,328,580 B2 | 2/2008 | Lee et al. | |
| 7,374,401 B2 | 5/2008 | Lee | |
| 7,578,653 B2 | 8/2009 | Klasing et al. | |
| 7,726,131 B2 | 6/2010 | Sze et al. | |
| 7,766,609 B1 | 8/2010 | Liang | |
| 7,887,294 B1 | 2/2011 | Liang | |
| 7,997,868 B1 | 8/2011 | Liang | |
| 8,038,399 B1 | 10/2011 | Liang | |
| 8,057,181 B1 * | 11/2011 | Liang | 416/97 R |
| 8,245,519 B1 * | 8/2012 | Liang | 60/806 |
| 2001/0036401 A1 | 11/2001 | Harvey et al. | |
| 2002/0159888 A1 | 10/2002 | Rinck et al. | |
| 2005/0106020 A1 | 5/2005 | Bunker et al. | |
| 2005/0286998 A1 | 12/2005 | Lee et al. | |
| 2006/0163211 A1 | 7/2006 | Pietraszkiewicz et al. | |
| 2008/0003096 A1 | 1/2008 | Kohli et al. | |
| 2008/0145208 A1 | 6/2008 | Klasing et al. | |
| 2009/0013695 A1 | 1/2009 | Dierberger et al. | |
| 2009/0304499 A1 | 12/2009 | Strock et al. | |
| 2010/0068032 A1 | 3/2010 | Liang | |
| 2010/0068068 A1 | 3/2010 | Liang | |
| 2010/0282721 A1 | 11/2010 | Bunker et al. | |
| 2011/0097191 A1 | 4/2011 | Bunker | |
| 2011/0185572 A1 | 8/2011 | Wei et al. | |
| 2011/0293423 A1 | 12/2011 | Bunker et al. | |
| 2012/0051941 A1 | 3/2012 | Bunker | |
| 2012/0167389 A1 * | 7/2012 | Lacy et al. | 29/889.1 |

OTHER PUBLICATIONS

The International Search Report mailed Nov. 1, 2013 for International Application No. PCT/US2013/025705.

* cited by examiner

COOLING HOLE WITH ASYMMETRIC DIFFUSER

CROSS-REFERENCE TO RELATED APPLICATIONS

This application claims priority to U.S. Provisional Application No. 61/599,387, filed on Feb. 15, 2012 and entitled "COOLING HOLE WITH ASYMMETRIC DIFFUSER", U.S. Provisional Application No. 61/599,381, filed on Feb. 15, 2012 and entitled "TRI-LOBED COOLING HOLE AND METHOD OF MANUFACTURE", U.S. Provisional Application No. 61/599,372, filed on Feb. 15, 2012 and entitled "MULTI-LOBED COOLING HOLE AND METHOD OF MANUFACTURE", the disclosures of which are incorporated by reference in their entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

Components present in the hot gas path of a gas turbine engine require cooling to prevent component melting and to reduce the effects of thermal fatigue and wear. Hollow blades and vanes, combustor walls and other components include thin metal walls made of high strength materials that provide durability. While these materials reduce the amount of cooling necessary, components in the hot gas path still require some sort of surface cooling.

Film cooling holes are often used to cool these components. This type of cooling works by delivering cool air (e.g., air bled from a compressor) through small holes in the wall surface of the component. This air creates a thin layer (film) of cool air on the surface of the component wall, protecting it from higher temperature air and gases. One consideration with film cooling is that injecting cool air into a component reduces engine efficiency. The drop in efficiency increases as the amount of cooling airflow increases.

Diffusion cooling holes were designed to increase the spread of the cooling film to reduce the debit on engine efficiency. By spreading out the film of cooling air, smaller amounts of cooling air could be used to cool an area. One problem with diffusion cooling holes is flow separation. Diffusion cooling holes can only spread cooling air to a certain extent before the flow separates, creating a "hole" in the cooling film. Flow separation is likely to occur at the "corners" of state of the art diffusion holes. Additionally, at high blowing ratios, the cooling film can "jet" or "blow off" the surface of the component, allowing nearby hot gases to cover the surface and reducing cooling effectiveness.

SUMMARY

A gas turbine engine component includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally from the metering section and a second lobe adjacent the first lobe and diverging longitudinally and laterally from the metering section.

A wall of a component of a gas turbine engine includes first and second wall surfaces, an inlet located at the first wall surface, an outlet located at the second wall surface, a metering section commencing at the inlet and extending downstream from the inlet and a diffusing section extending from the metering section and terminating at the outlet. The diffusing section includes a first lobe diverging longitudinally from the metering section, a second lobe adjacent the first lobe and diverging longitudinally and laterally from the metering section and a ridge located between the first and second lobes.

A method for producing a cooling hole in a gas turbine engine wall having first and second wall surfaces includes forming a metering section between the first wall surface and the second wall surface and forming a diffusing section between the metering section and the second wall surface. The diffusing section includes a first lobe in line with the metering section and a second lobe that diverges laterally from the metering section. The diffusing section distributes the flow of the fluid into the lobes to form a film of cooling fluid at a hole outlet at the second wall surface of the gas turbine engine wall.

DETAILED DESCRIPTION

Figure 1:
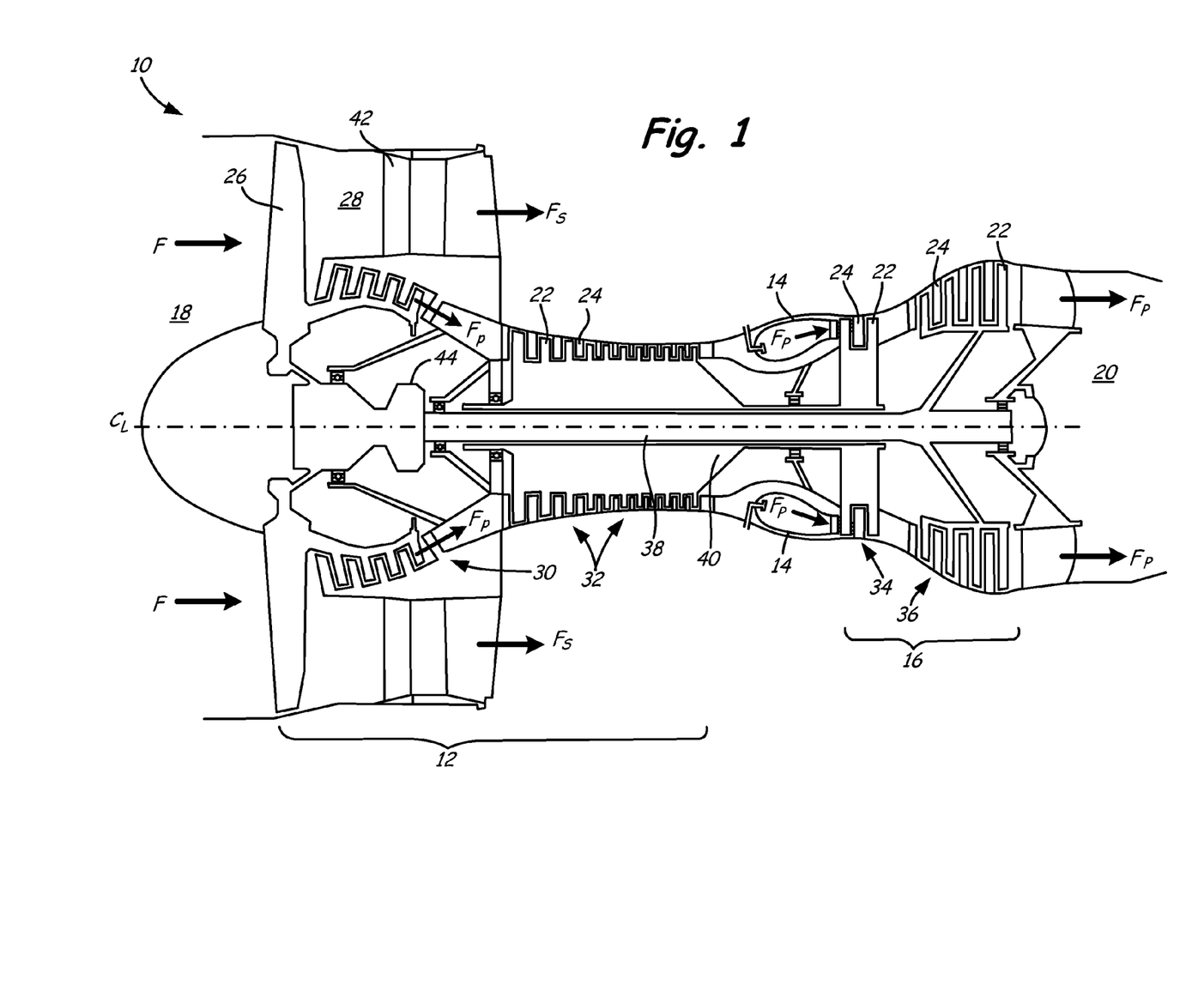
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
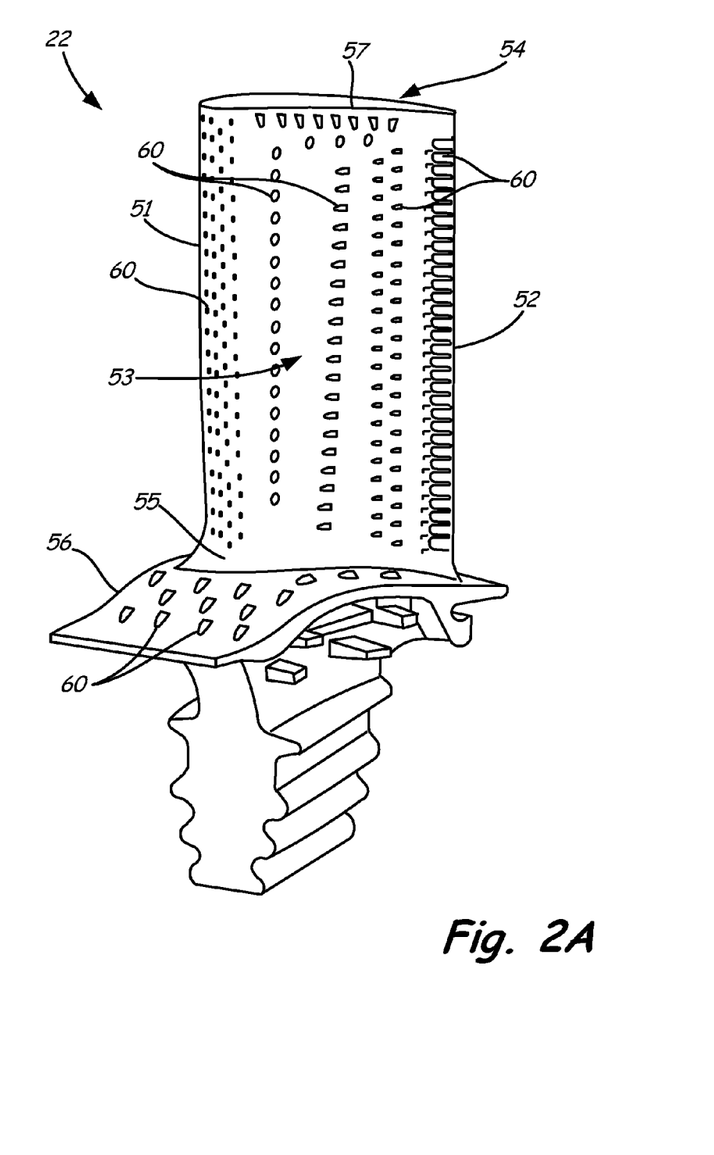
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
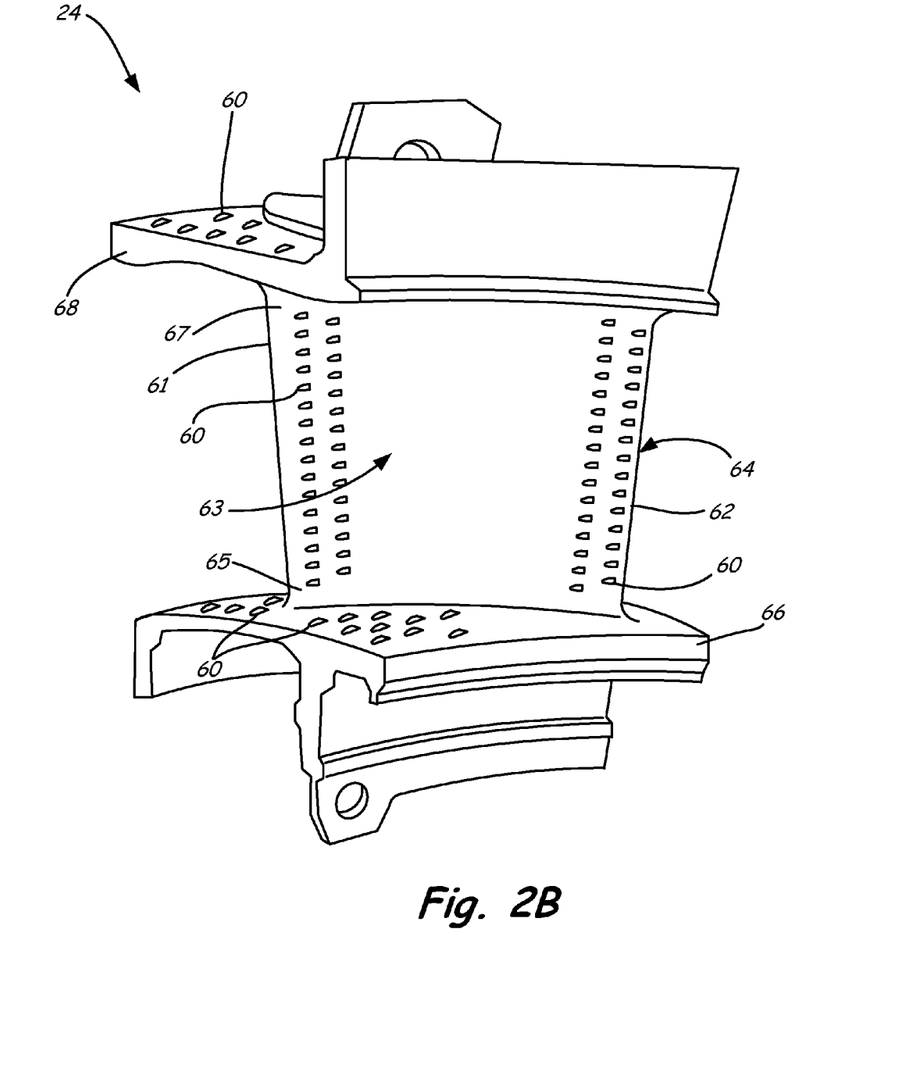
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Figure 3:
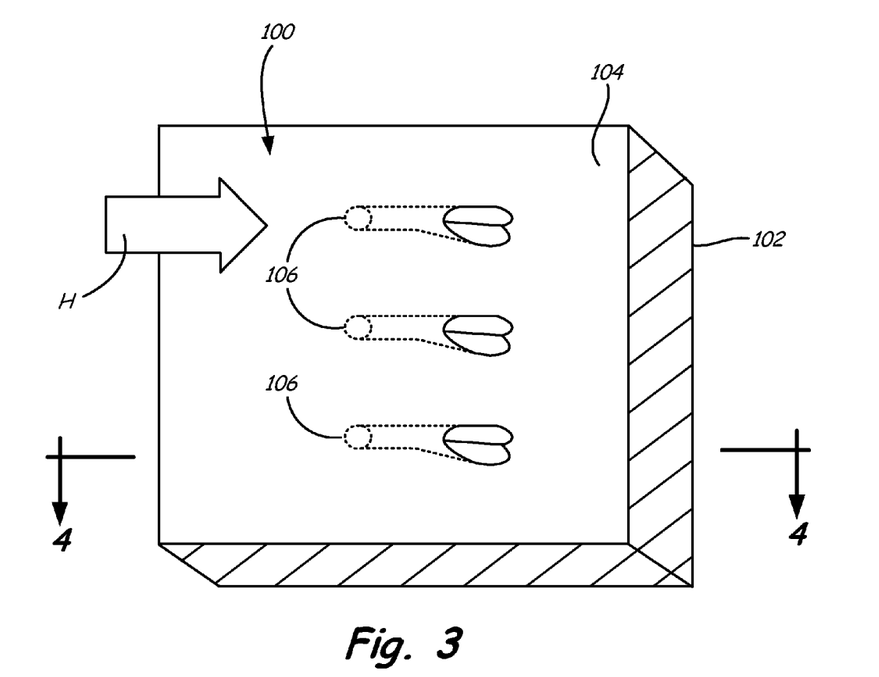
FIG. 3 is a view of a wall having cooling holes with asymmetric diffusing sections.

FIG. 3 illustrates a view of a wall of a gas turbine engine component having cooling holes with asymmetric diffusing sections. Wall 100 includes first wall surface 102 and second wall surface 104. As described in greater detail below, wall 100 is primarily metallic and second wall surface 104 can include a thermal barrier coating. Cooling holes 106 are oriented so that their inlets are positioned on the first wall surface 102 and their outlets are positioned on second wall surface 104. During gas turbine engine operation, second wall surface 104 is in proximity to high temperature gases (e.g., combustion gases, hot air). Cooling air is delivered inside wall 100 where it exits the interior of the component through cooling holes 106 and forms a cooling film on second wall surface 104. As shown in FIG. 3, cooling holes 106 have two lobes in the diffusing section of the cooling hole outlet on second wall surface 104.

As described below in greater detail, cooling air flows out of cooling holes 106 and flows through each of the lobes in the diffusing section. Cooling holes 106 can be arranged in a row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along second wall surface 104 (represented by arrow H). Here, the linear row of cooling holes 106 is substantially perpendicular to the direction of flow H. In alternate embodiments, the orientation of cooling holes 106 can be arranged on second wall surface 104 so that the flow of cooling air is at an angle between parallel and perpendicular. Cooling holes 106 can also be provided in a staggered formation on wall 100. Cooling holes 106 can be located on a variety of components that require cooling. Suitable components include, but are not limited to, turbine vanes and blades, combustors, blade outer air seals, augmentors, etc. Cooling holes 106 can be located on the pressure side or suction side of vanes and blades. Cooling holes 106 can also be located on the blade tip or blade or vane platforms. Cooling holes 106 can also be located near airfoil endwalls or at other locations and individually aligned to provide targeted flow of cooling air.

Figure 4:
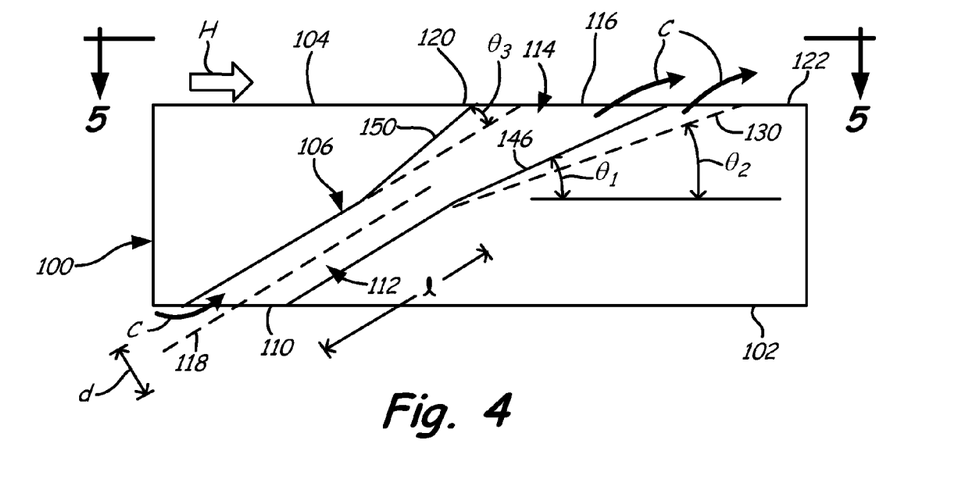
FIG. 4 is a sectional view of the cooling hole of FIG. 3 taken along the line 4-4.
Figure 5:
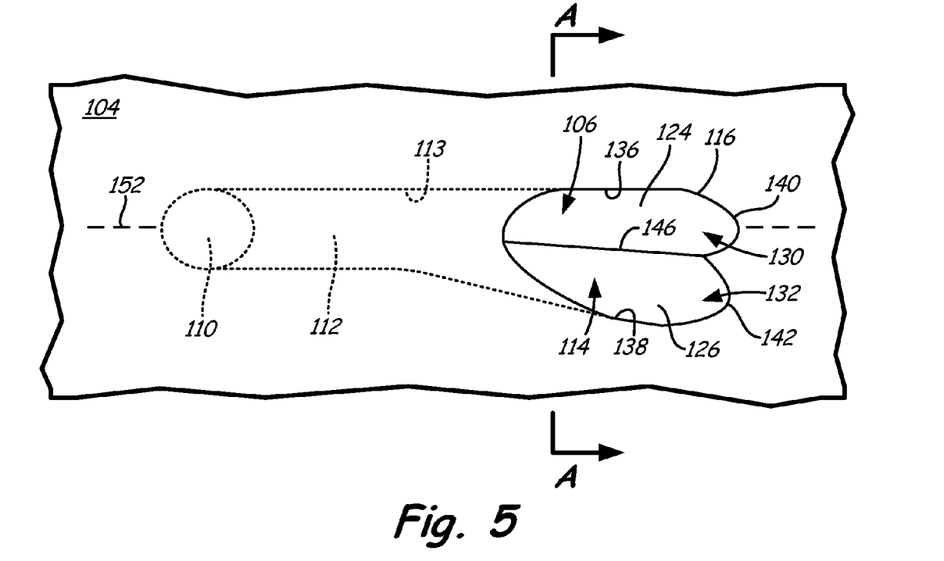
FIG. 5 is a view of the cooling hole of FIG. 4 taken along the line 5-5.

FIGS. 4 and 5 illustrate embodiments of cooling hole 106 in greater detail. FIG. 4 illustrates a sectional view of cooling hole 106 of FIG. 3 taken along the line 4-4. FIG. 5 illustrates a view of cooling hole 106 of FIG. 4 taken along the line 5-5. Cooling hole 106 includes inlet 110, metering section 112 and diffusing section 114. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 extends downstream from inlet 110 and controls (meters) the flow of cooling air through cooling hole 106. In exemplary embodiments, metering section 112 has a substantially constant flow area from inlet 110 to diffusing section 114. Metering section 112 can have circular, oblong (oval or elliptical) or racetrack (oval with two parallel sides having straight portions) shaped cross sections. In FIGS. 4 and 5, metering section 112 has a circular cross section. Circular metering sections 112 have a length l and diameter d. In some embodiments, circular metering section 112 has a length l according to the relationship: d≤l≤3d. That is, the length of metering section 112 is between one and three times its diameter. The length of metering section 22 can exceed 3d, reaching upwards of 30d. In alternate embodiments, metering section 112 has an oblong or racetrack-shaped or other shaped cross section. As oblong and racetrack configurations are not circular, their metering sections 112 have a length l and hydraulic diameter $d_h$. In some embodiments, metering section 112 has a length l according to the relationship: $d_h$≤l≤$3d_h$. That is, the length of metering section 112 is between one and three times its hydraulic diameter. Again, the length of metering section 112 can exceed $3d_h$, reaching upwards of $30d_h$. In exemplary embodiments, metering section 112 is inclined with respect to wall 100 as illustrated in FIG. 4 (i.e. metering section 112 is not perpendicular to wall 100). Metering section 112 has a longitudinal axis represented by numeral 118. Metering section 112 also has a lateral sidewall 113 as shown in FIG. 5.

Diffusing section 114 is adjacent to and downstream from metering section 112. Cooling air C diffuses within diffusing section 114 before exiting cooling hole 106 at outlet 116 along second wall surface 104. Once cooling air C exits metering section 112, the flow of air expands to fill diffusing section 114. Cooling air C diffuses longitudinally (shown best in FIG. 4). In some embodiments, cooling air diffuses both longitudinally and laterally (shown best in FIG. 5) in diffusing section 114. Second wall surface 104 includes upstream end 120 (upstream of cooling hole 106) and downstream end 122 (downstream from cooling hole 106). Diffusing section 114 opens along second wall surface 104 between upstream end 120 and downstream end 122. As shown in FIG. 4, cooling air C diffuses in diffusing section 114 as it flows towards outlet 116.

As shown best in FIG. 5, diffusing section 114 includes two lobes 124 and 126. Each lobe 124, 126 has a bottom surface (bottom surfaces 130 and 132, respectively). Lobes 124 and 126 each have a side wall along the outer edge of diffusing section 114 (side walls 136 and 138, respectively). Each lobe 124, 126 also has a trailing edge (trailing edges 140 and 142, respectively). Lobes 124 and 126 meet along ridge 146. Ridge 146 can be straight or curved, both longitudinally and laterally. As shown in FIG. 4, each lobe diverges longitudinally from metering section 112. FIG. 4 illustrates a sectional view taken through the center of cooling hole 106 and shows ridge 146 between lobes 124 and 126. Ridge 146 is inclined with respect to second wall surface 104 as shown by inclination angle $\theta_1$. Bottom surfaces 130 and 132 of lobes 124 and 126, respectively, are also inclined with respect to second wall surface 104 as shown by inclination angle $\theta_2$. Inclination angle $\theta_2$ indicates a downstream angle for each lobe. In the embodiment shown in FIG. 4, bottom surfaces 130 and 132 of lobes 124 and 126 have the same inclination angle $\theta_2$ (downstream angle). As described in greater detail below, bottom surfaces 130 and 132 do not need to have the same depth or inclination angle. Cooling air C flowing through diffusing section 114 diverges longitudinally from longitudinal axis 118 as it "attaches" to bottom surfaces 130 and 132 of respective lobes 124 and 126. Lobes 124 and 126 meet with second wall surface 104 at trailing edges 140 and 142, respectively.

In some embodiments, cooling air C passing through cooling hole 106 also diffuses longitudinally near upstream end 120. The upstream portion of diffusing section 114 is bounded by forward edge 150. Forward edge 150 can be parallel with the upstream edge of metering section 112 (and with longitudinal axis 118), inclined towards upstream end 120 or inclined towards downstream end 122. In exemplary embodiments, forward edge 150 is parallel with the upstream edge of metering section 112 (i.e. no upstream longitudinal diffusion) or inclined towards downstream end 122. In the embodiment illustrated in FIG. 4, forward edge 150 is inclined slightly towards upstream end 120 from longitudinal axis 118 (represented by inclination angle $\theta_3$). In some embodiments, forward edge 150 is inclined towards upstream end 120 to accommodate certain manufacturing methods. In these embodiments, the magnitude of inclination angle $\theta_3$ is minimized to less than about 15° and, in another embodiment, to less than about 1°. By minimizing inclination angle $\theta_3$ and positioning the end of forward edge 150 at second wall surface 104 as far downstream as possible, cooling air C exiting outlet 116 is likely to be more effective. In some embodiments, forward edge 150 is inclined towards downstream 122 (rather than upstream end 120) at an inclination angle $\theta_3$ of up to about −2°.

While cooling air C diffuses longitudinally within diffusing section 114 as shown in FIG. 4, cooling air also diffuses laterally within diffusing section 114 as shown in FIG. 5. Lobe 126 diverges laterally with respect to metering section 112. Lobe 124 includes side wall 136 on the side of lobe 124 opposite ridge 146. Lobe 126 includes side wall 138 on the side of lobe 126 opposite ridge 148. As illustrated in FIG. 5, lobe 126 diverges laterally in a downward direction away from centerline axis 152. Centerline axis 152 is a longitudinal axis passing through the center of metering section 112. On the other hand, sidewall 136 of lobe 124 is parallel with lateral sidewall 113 of metering section 112 and does not diverge in an upward direction away from centerline axis 152. Thus, lobe 124 does not laterally diverge away from centerline axis 152 to a substantial degree. Ridge 146 is angled downward (as shown in FIG. 5) slightly, allowing some lateral divergence of flow through lobe 124. Ridge 146 can be angled downward to a greater degree to increase the lateral divergence of flow through lobe 124 in one direction. Alternatively, ridge 146 can be parallel to sidewall 136 and metering section 112.

Ridge 146 aids in directing cooling air C into lobes 124 and 126. Ridge 146 is generally an inverted V-shaped portion where the adjacent lobes meet. Ridge 146 can form a sharp edge between the lobes, where edges of adjacent lobes meet at a point. Alternatively, ridge 146 can be rounded or have other geometric shapes. Ridge 146 can form a straight line between adjacent lobes. Alternatively, ridge 146 can be laterally curved. As cooling air C exits metering section 112 and enters diffusing section 114, cooling air 26 encounters ridge 146. Ridge 146 can extend farther towards second wall surface 104 than lobes 124 and 126 as shown in FIG. 4 and evidenced by the difference in inclination angles $\theta_1$ (top of ridge) and $\theta_2$ (bottom surface of lobe). As a result, ridge 146 projects towards second wall surface 104 and serve to guide the flow of cooling air C into lobes 124 and 126. Ridge 146 divides the flow of cooling air C between lobes 124 and 126, causing cooling air C flowing into lobe 126 to diverge laterally to correspond to the shape of lobe 126.

Figure 5A:
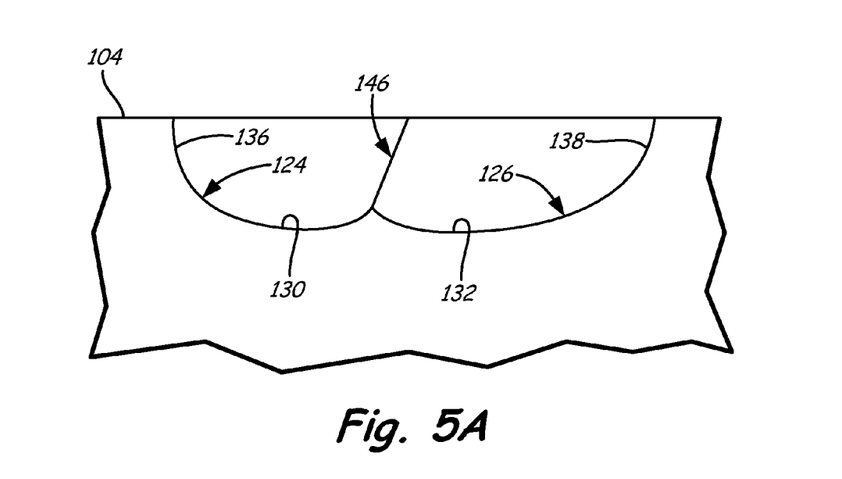
FIG. 5A is a view of the cooling hole of FIG. 5 taken along the line A-A.

In exemplary embodiments, bottom surfaces 130 and 132 of lobes 124 and 126, respectively, include a curved portion. As shown in FIG. 5A, the outer portion of lobes 124 and 126 can be curved. Lobe 124 includes a curved surface at side wall 136 and a curved bottom surface 130. Lobe 126 includes a curved surface at side wall 138 and a curved bottom surface 132. In this embodiment, bottom surfaces 130 and 132 are concave (i.e. curve towards first wall surface 102).

Figure 6:
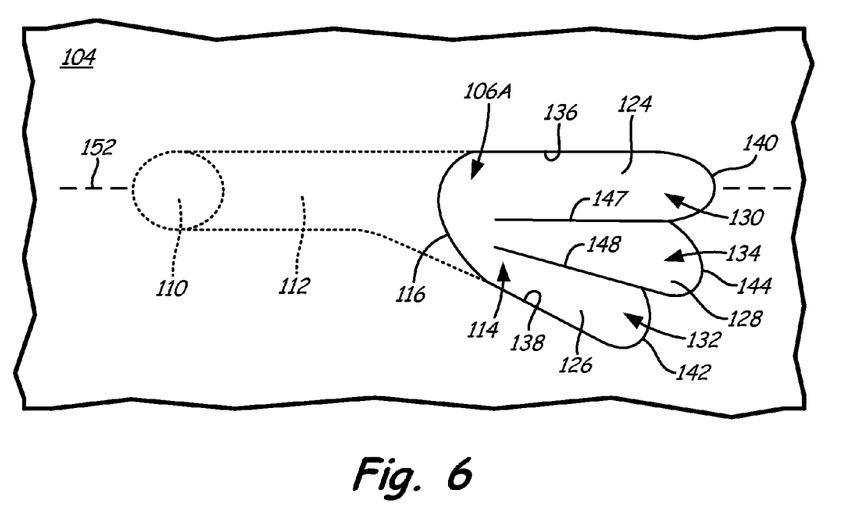
FIG. 6 is another embodiment of a cooling hole with an asymmetric diffusing section.

FIG. 6 is a top view of another embodiment of a cooling hole, cooling hole 106A. As shown in FIG. 6, diffusing section 114 of cooling hole 106A includes three lobes. Lobe 128 is located between lobes 124 and 126. Lobe 128 includes bottom surface 134 and trailing edge 144. Ridge 147 separates lobe 124 and lobe 128, and ridge 148 separates lobe 126 and lobe 128. Adding lobe 128 increases the amount of lateral divergence of cooling air C in diffusing section 114. Ridges 147 and 148 divide the flow of cooling air C between lobes 124, 126 and 128, causing cooling air C flowing into lobes 126 and 128 to diverge laterally.

Lobes 124, 126 and 128 meet and blend with second wall surface 104 at trailing edges 140, 142 and 144, respectively. Lobes 124, 126 and 128 can blend with second wall surface 104 in a number of ways. In one embodiment, each lobe blends with second wall surface 104 at the same axial distance from inlet 110, such that trailing edges 140, 142 and 144 form a generally straight line. FIG. 5 illustrates an embodiment in which the trailing edges of the lobes form a generally straight line. In another embodiment, trailing edges 140, 142 and 144 are equidistant from a point on upstream end 120. In the embodiment illustrated in FIG. 6, lobes 124, 126 and 128 have trailing edges 140, 142 and 144, respectively that vary in distance from inlet 110 based on lateral position.

Lobes 124, 126 and 128 can vary in depth. For example, as noted above, inclination angle $\theta_2$ indicates the inclination of the bottom surface of a lobe with respect to second wall surface 104 (e.g., bottom surface 130 of lobe 124 in FIG. 4). Bottom surfaces 130, 132 and 134 of respective lobes 124, 126 and 128 can all have the same inclination angle $\theta_2$ and depth from second wall surface 104. Alternatively, bottom surfaces 130, 132 and 134 can have different inclination angles $\theta_2$, forming lobes of differing depth. For example, bottom surfaces 130 and 132 can have the same inclination angle $\theta_2$ while bottom surface 134 of middle lobe 128 has a different inclination angle $\theta_2$ and a depth different from lobes 124 and 126.

Lobes 124, 126 and 128 can also vary in size. For example, as shown in FIG. 6, lobes 126 and 128 are smaller (i.e. have smaller widths at an upstream region of diffusing section 114) than lobe 124. In some embodiments, lobes 124, 126 and 128 have the same size (e.g., same surface area). In alternate embodiments, lobes 124, 126 and 128 have varying sizes or shapes to better laterally diffuse cooling air C according to the geometry of the component containing cooling hole 106. Exemplary shapes and sizes of lobes 124, 126 and 128 depend on a number of factors including: the thickness of wall 100, the angle at which metering section 112 of cooling hole 106 is inclined relative to wall 100, any curvature present on wall 100 in the vicinity of cooling hole 106 and/or the high temperature gas profile flowing past wall 100.

Figure 7:
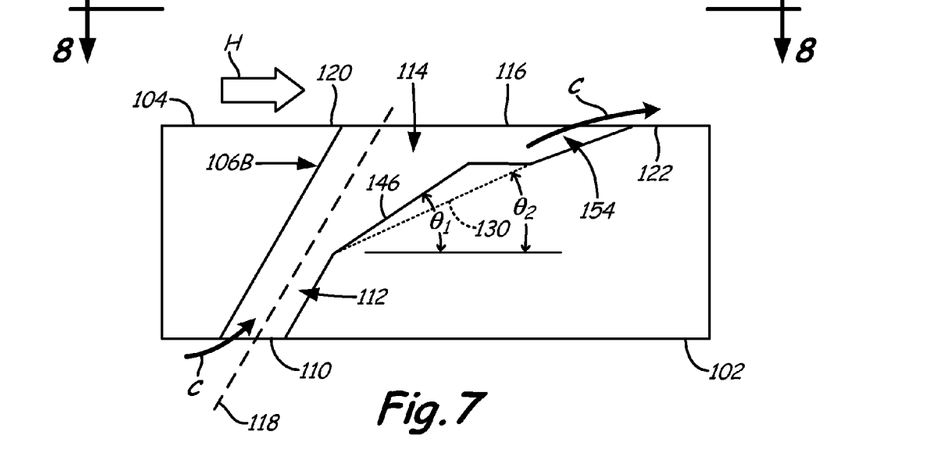
FIG. 7 is a sectional view of another embodiment of a cooling hole with an asymmetric diffusing section.
Figure 8:
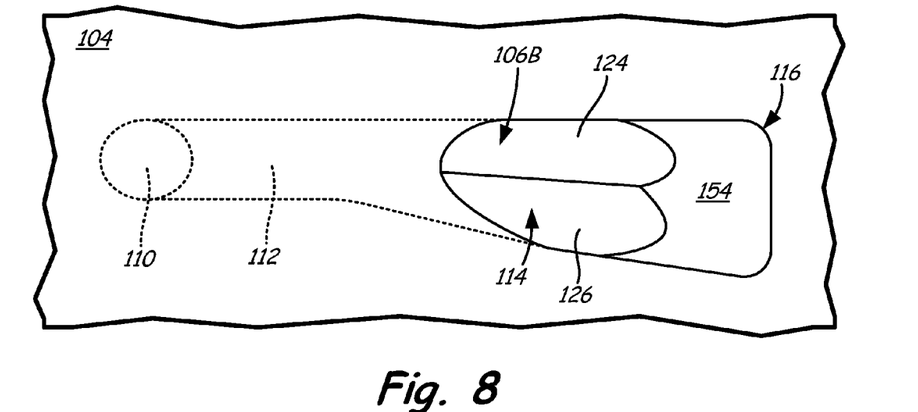
FIG. 8 is a view of the cooling hole of FIG. 7 taken along the line 8-8.

FIGS. 7 and 8 illustrate another embodiment of a cooling hole. FIG. 7 illustrates a sectional view of cooling hole 106B (same cross section view as FIG. 4). FIG. 8 illustrates a view of cooling hole 106B of FIG. 7 taken along the line 8-8. In this embodiment, diffusing section 114 also includes transition region 154. As shown in FIG. 7, ridge 146 (and lobes 124 and 126) do not extend all the way to outlet 116. Instead, transition region 154 is positioned between outlet 116 and ridge 146 and lobes 124 and 126. Transition region 154 can take various shapes and have different configurations depending on the location and desired flow profile of cooling hole 106. The bottom surface of transition region 154 can be flat or curved. A curved (e.g., longitudinally convex) bottom surface of transition region 154 can facilitate improved flow attachment on the bottom surface.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Figure 9A:
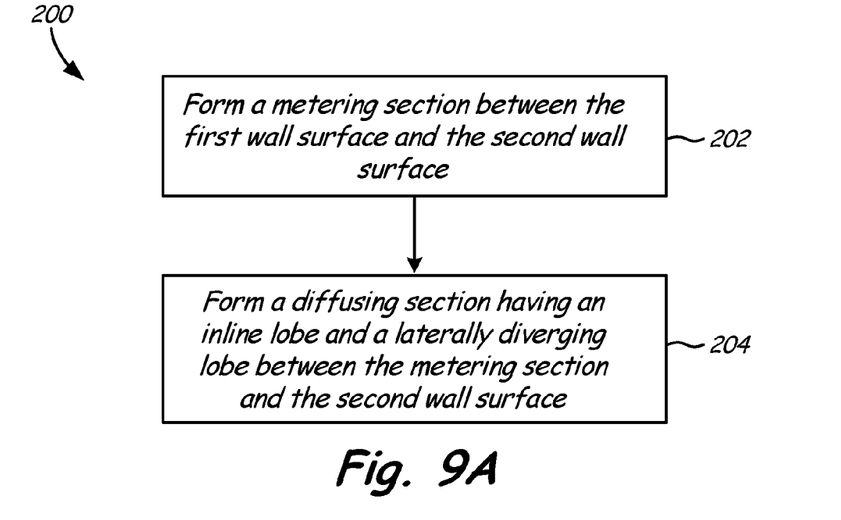
FIG. 9A is a simplified flow diagram illustrating one embodiment of a method for producing a tri-lobed cooling hole.

FIG. 9A is a simplified flow diagram illustrating one embodiment of a method for producing a multi-lobed cooling hole in a gas turbine engine wall having first and second wall surfaces. Method 200 includes forming a metering section between the first and second surfaces (step 202) and forming a diffusing section between the metering section and the second wall surface (step 204). Metering section 112 is formed in step 202 by one or more of the casting, machining or drilling techniques described above. The technique(s) chosen is/are typically determined based on performance, reproducibility and cost. In embodiments where step 202 occurs prior to step 204, inlet 110 and portions of diffusing section 114 and outlet 116 can also be formed during formation of metering section 112. Diffusing section 114 is formed in step 204 by one or more of the casting, machining or drilling techniques described above. As with metering section 112, the technique(s) chosen is/are typically determined based on performance, reproducibility and cost. The diffusing section is formed in step 204 to have a first lobe in line with the metering section and a second lobe that diverges laterally from the metering section. Diffusing section 114 distributes the flow of the fluid into the lobes to form a film of cooling fluid at a hole outlet at the second wall surface of the gas turbine engine wall.

Figure 9B:
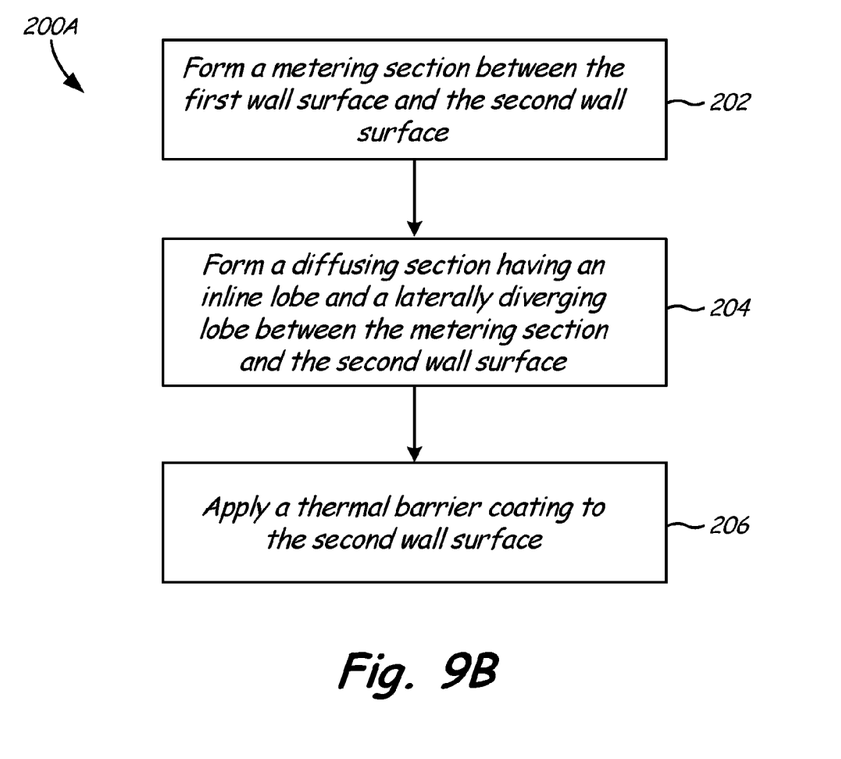
FIG. 9B is a simplified flow diagram illustrating another embodiment of a method for producing a tri-lobed cooling hole.

In embodiments where step 202 occurs prior to step 204, outlet 116 is fully formed once step 204 has been completed. Method 200 can be performed before or after an optional thermal barrier coating application. In optional step 206 (shown as a step in method 200A in FIG. 9B), a thermal barrier coating is applied to second wall surface 104. Application of the thermal barrier coating can also include the application of a bond coating prior to the thermal barrier coating. The steps of method 200A can be performed in any order depending on the location of cooling hole 106 and the location of diffusing section 114 relative to the metallic wall and the thermal barrier coating. As previously stated, the order of the steps can affect the machining or drilling techniques chosen.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A gas turbine engine component can include a wall having first and second wall surfaces and a cooling hole extending through the wall. The cooling hole can include an inlet located at the first wall surface, an outlet located at the second wall surface, a metering section extending downstream from the inlet and a diffusing section extending from the metering section to the outlet. The diffusing section can include a first lobe diverging longitudinally from the metering section and a second lobe adjacent the first lobe and diverging longitudinally and laterally from the metering section.

The system of the preceding paragraph can optionally include, additionally and/or alternatively any, one or more of the following features, configurations and/or additional components:

at least one of the first and second lobes can include a curved bottom portion;

the first lobe and the second lobe can meet at a ridge;

at least one of the first and second lobes can include a curved outer portion;

the metering section can include a first lateral side, and the first lateral side of the metering section can be parallel to the curved outer portion of the first lobe;

the metering section can further include a longitudinal axis, and the curved outer portion of the first lobe and the first lateral side of the metering section can be equidistant from the longitudinal axis of the metering section;

the metering section can be inclined between the first wall surface and the second wall surface;

the first lobe can include a first depth and a first downstream angle, the second lobe can include a second depth and a second downstream angle, and the first depth and the second depth can be equal and the first downstream angle and the second downstream angle can be equal;

the first lobe can include a first depth and a first downstream angle, the second lobe can include a second depth and a second downstream angle, and the first depth and the second depth can be different or the first downstream angle and the second downstream angle can be different;

the diffusing section can further include a transition region extending between the first and second lobes and the outlet;

the transition region can further include a curved surface; and/or the component can be selected from the group consisting of blades, vanes, airfoil tips, airfoil platforms, combustors, blade outer air seals and augmentors.

A wall of a component of a gas turbine engine can include first and second wall surfaces, an inlet located at the first wall surface, an outlet located at the second wall surface, a metering section commencing at the inlet and extending downstream from the inlet and a diffusing section extending from the metering section and terminating at the outlet. The diffusing section can include a first lobe diverging longitudinally from the metering section, a second lobe adjacent the first lobe and diverging longitudinally and laterally from the metering section and a ridge located between the first and second lobes.

The system of the preceding paragraph can optionally include, additionally and/or alternatively any, one or more of the following features, configurations and/or additional components:

at least one of the first and second lobes can include a curved bottom portion;

at least one of the first and second lobes can include a curved outer portion;

the metering section can include a first lateral side, and the first lateral side of the metering section can be parallel to the curved outer portion of the first lobe;

the metering section can further include a longitudinal axis, and the curved outer portion of the first lobe and the first lateral side of the metering section can be equidistant from the longitudinal axis of the metering section;

the diffusing section can further include a transition region extending between the first and second lobes and the outlet;

the transition region can further include a curved surface; and/or the component can be selected from the group consisting of blades, vanes, airfoil tips, airfoil platforms, combustors, blade outer air seals and augmentors.

A method for producing a cooling hole in a gas turbine engine wall having first and second wall surfaces can include forming a metering section between the first wall surface and the second wall surface and forming a diffusing section between the metering section and the second wall surface. The diffusing section can include a first lobe in line with the metering section and a second lobe that diverges laterally from the metering section. The diffusing section distributes the flow of the fluid into the lobes to form a film of cooling fluid at a hole outlet at the second wall surface of the gas turbine engine wall.

The system of the preceding paragraph can optionally include, additionally and/or alternatively any, one or more of the following features, configurations and/or additional components:

forming the metering section and forming the diffusing section can be performed by electrical discharge machining, laser drilling, laser machining, electrical chemical machining, waterjet machining, casting, conventional machining and combinations thereof.

The invention claimed is:

1. A gas turbine engine component comprising:
    a wall having first and second opposing wall surfaces and defining a cooling hole, the cooling hole extending from an inlet in the first surface to an outlet in the second surface and having:
        a metering section extending downstream from the inlet and comprising a first lateral sidewall; and
        a diffusing section extending from the metering section to the outlet and comprising:
            a first lobe diverging longitudinally from the metering section and comprising a second lateral sidewall parallel to the first lateral sidewall; and
            a second lobe adjacent the first lobe and diverging longitudinally and laterally from the metering section.

2. The component of claim 1, wherein at least one of the first and second lobes comprise a curved bottom portion.

3. The component of claim 1, wherein the first lobe and the second lobe meet at a ridge.

4. The component of claim 1, wherein at least one of the first and second lobes comprise a curved outer portion.

5. The component of claim 1, wherein the metering section, and the first lobe share a lateral sidewall.

6. The component of claim 1, wherein the metering section is inclined between the first wall surface and the second wall surface.

7. The component of claim 1, wherein the first lobe comprises a first depth and a first downstream angle, and wherein the second lobe comprises a second depth and a second downstream angle, and wherein the first depth and the second depth are equal and the first downstream angle and the second downstream angle are equal.

8. The component of claim 1, wherein the first lobe comprises a first depth and a first downstream angle, and wherein the second lobe comprises a second depth and a second downstream angle, and wherein the first depth and the second depth are different or the first downstream angle and the second downstream angle are different.

9. The component of claim 1, wherein the diffusing section further comprises:
    a transition region separating the first and second lobes from the outlet.

10. The component of claim 9, wherein the transition region further comprises a curved surface.

11. The component of claim 1, wherein the component is selected from the group consisting of blades, vanes, airfoil tips, airfoil platforms, combustors, blade outer air seals and augmentors.

12. A wall of a component of a gas turbine engine, the wall comprising:
    first and second wall surfaces;
    an inlet located at the first wall surface;
    an outlet located at the second wall surface;
    a metering section commencing at the inlet and extending downstream from the inlet and comprising a first lateral sidewall; and
    a diffusing section extending from the metering section and terminating at the outlet, the diffusing section comprising:
        a first lobe diverging longitudinally from the metering section and comprising a second lateral sidewall parallel to the first lateral sidewall;
        a second lobe adjacent the first lobe and diverging longitudinally and laterally from the metering section; and
        a ridge located between the first and second lobes.

13. The wall of claim 12, wherein at least one of the first and second lobes comprise a curved bottom portion.

14. The wall of claim 12, wherein at least one of the first and second lobes comprise a curved outer portion.

15. The wall of claim 14, wherein the metering section and the first lobe share a lateral sidewall.

16. The wall of claim 12, wherein the diffusing section further comprises:
    a transition region extending between the first and second lobes and the outlet.

17. The wall of claim 16, wherein the transition region further comprises a curved surface.

18. The wall of claim 12, wherein the component is selected from the group consisting of blades, vanes, airfoil tips, airfoil platforms, combustors, blade outer air seals and augmentors.

19. A method for producing a cooling hole in a gas turbine engine wall having first and second wall surfaces, the method comprising:
    forming a metering section between the first wall surface and the second wall surface, wherein the metering section comprises a first lateral sidewall; and
    forming a diffusing section between the metering section and the second wall surface, wherein the diffusing section distributes the flow of the fluid into lobes to form a film of cooling fluid at a hole outlet at the second wall surface of the gas turbine engine wall, and wherein the diffusing section comprises:
        a first lobe that diverges longitudinally from the metering section and comprising a second lateral sidewall parallel to the first lateral sidewall; and
        a second lobe adjacent the first lobe that diverges longitudinally and laterally from the metering section.

20. The method of claim 19, wherein forming the metering section and forming the diffusing section are performed by electrical discharge machining, laser drilling, laser machining, electrical chemical machining, waterjet machining, casting, conventional machining and combinations thereof.

* * * * *